United States Patent
O'Connor et al.

(10) Patent No.: US 11,928,452 B2
(45) Date of Patent: Mar. 12, 2024

(54) REDUCING THE SIZE OF IMAGE FILES USABLE FOR DEPLOYING SOFTWARE IN COMPUTING ENVIRONMENTS

(71) Applicant: Red Hat, Inc., Raleigh, NC (US)

(72) Inventors: Cathal O'Connor, Waterford (IE); Brian Gallagher, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/592,140

(22) Filed: Feb. 3, 2022

(65) Prior Publication Data
US 2023/0244467 A1  Aug. 3, 2023

(51) Int. Cl.
*G06F 8/61* (2018.01)
*G06F 8/65* (2018.01)
*G06F 21/57* (2013.01)

(52) U.S. Cl.
CPC .................. *G06F 8/63* (2013.01); *G06F 8/65* (2013.01); *G06F 21/577* (2013.01); *G06F 2221/033* (2013.01)

(58) Field of Classification Search
CPC . G06F 8/63; G06F 8/65; G06F 21/577; G06F 2221/033
See application file for complete search history.

(56) References Cited

U.S. PATENT DOCUMENTS

| | | | | |
|---|---|---|---|---|
| 8,458,142 B2* | 6/2013 | Pace | ...................... | H04L 63/101 707/690 |
| 9,792,141 B1* | 10/2017 | Sethuramalingam | ..... | G06F 8/63 |
| 10,528,337 B1* | 1/2020 | Varadharajan Kannan | .................. | G06F 8/71 |
| 10,552,133 B2* | 2/2020 | Yang | ......................... | G06F 8/63 |
| 11,062,022 B1 | 7/2021 | Kalamkar et al. | | |
| 11,093,221 B1* | 8/2021 | Novy | ......................... | G06F 8/63 |
| 2009/0083404 A1* | 3/2009 | Lenzmeier | .............. | G06F 15/16 709/221 |

(Continued)

FOREIGN PATENT DOCUMENTS

| | | | | |
|---|---|---|---|---|
| CN | 103988176 A | * | 8/2014 | ............... G06F 8/75 |
| CN | 105580042 A | * | 5/2016 | ......... G06Q 30/0251 |

(Continued)

OTHER PUBLICATIONS

Grohmann et al., "Detecting Parametric Dependencies for Performance Models Using Feature Selection Techniques", 2019, IEEE (Year: 2019).*

(Continued)

*Primary Examiner* — Wei Y Zhen
*Assistant Examiner* — Junchun Wu
(74) *Attorney, Agent, or Firm* — Kilpatrick Townsend & Stockton LLP

(57) ABSTRACT

The sizes of image files for deploying software in a computing environment can be reduced according to some examples described herein. In one example, a system can identify base image files that each include at least a predefined amount of dependencies relied upon by target software. The system can then select a particular base image file, from the base image files, having a smallest size as compared to a remainder of the base image files. The system can then build a customized image file from the base image file, where the customized image file is configured for deploying the target software to a computing environment.

20 Claims, 8 Drawing Sheets

(56) References Cited

U.S. PATENT DOCUMENTS

| | | | | |
|---|---|---|---|---|
| 2016/0139945 | A1* | 5/2016 | Griffith | G06F 3/067 |
| | | | | 718/1 |
| 2017/0315795 | A1* | 11/2017 | Keller | G06F 11/3006 |
| 2017/0340205 | A1* | 11/2017 | Liu | A61B 3/113 |
| 2018/0025160 | A1 | 1/2018 | Hwang et al. | |
| 2020/0082094 | A1* | 3/2020 | Mcallister | G06F 8/77 |
| 2021/0103450 | A1* | 4/2021 | Prasad | G06F 9/45558 |
| 2021/0255840 | A1* | 8/2021 | Novy | G06F 8/63 |
| 2022/0164184 | A1* | 5/2022 | Reddy | G06F 8/75 |
| 2023/0091915 | A1* | 3/2023 | Chen | G06F 8/658 |
| | | | | 717/168 |

FOREIGN PATENT DOCUMENTS

| | | | | | |
|---|---|---|---|---|---|
| CN | 111049912 | A | * | 4/2020 | |
| CN | 112711427 | A | * | 4/2021 | G06F 11/1417 |
| CN | 114443075 | A | * | 5/2022 | |
| EP | 4030285 | A1 | * | 7/2022 | G06F 8/433 |
| WO | WO-2012012584 | A1 | * | 1/2012 | H04N 13/128 |
| WO | 2021167507 | A1 | | 8/2021 | |

OTHER PUBLICATIONS

Ye et al., "DockerGen: A Knowledge Graph based Approach for Software Containerization", 2021, IEEE (Year: 2021).*

Szczypinski et al., "MaZda—A software package for image texture analysis", 2008, Elsevier (Year: 2008).*

Xu et al., "Mining Container Image Repositories for Software Configuration and Beyond", 2018, ACM/IEEE (Year: 2018).*

* cited by examiner

REDUCING THE SIZE OF IMAGE FILES USABLE FOR DEPLOYING SOFTWARE IN COMPUTING ENVIRONMENTS

TECHNICAL FIELD

The present disclosure relates generally to image files for deploying software in a computing environment. More specifically, but not by way of limitation, this disclosure relates to reducing the size of image files usable for deploying software in a computing environment.

BACKGROUND

Software can be deployed in computing environments using image files. An image file is generally a static file that includes executable code usable to deploy the software in a computing environment. An image file may also include the software's dependencies. Examples of such dependences can include the operating system, configuration files, packages, and libraries used to run the software. Incorporating the software's dependencies into the image files may allow the software to be quickly and easily deployed.

Image files are often configured for deploying their corresponding software inside isolated virtual environments that exist within a larger computing environment. For example, an image file may be configured to deploy software inside a container of a computing environment. A container is a relatively isolated virtual environment that can be generated by leveraging resource isolation features (e.g., cgroups and namespaces) of the Linux kernel. A deployment tool such as Docker® can be used to deploy the software inside the container from the image file. Deployment of software inside of such containers can be referred to as containerization. As another example, the image file may be configured to deploy the software inside a virtual machine of a computing environment. A deployment tool such as a hypervisor can be used to deploy the software inside the virtual machine from the image file.

DETAILED DESCRIPTION

Figure 1:
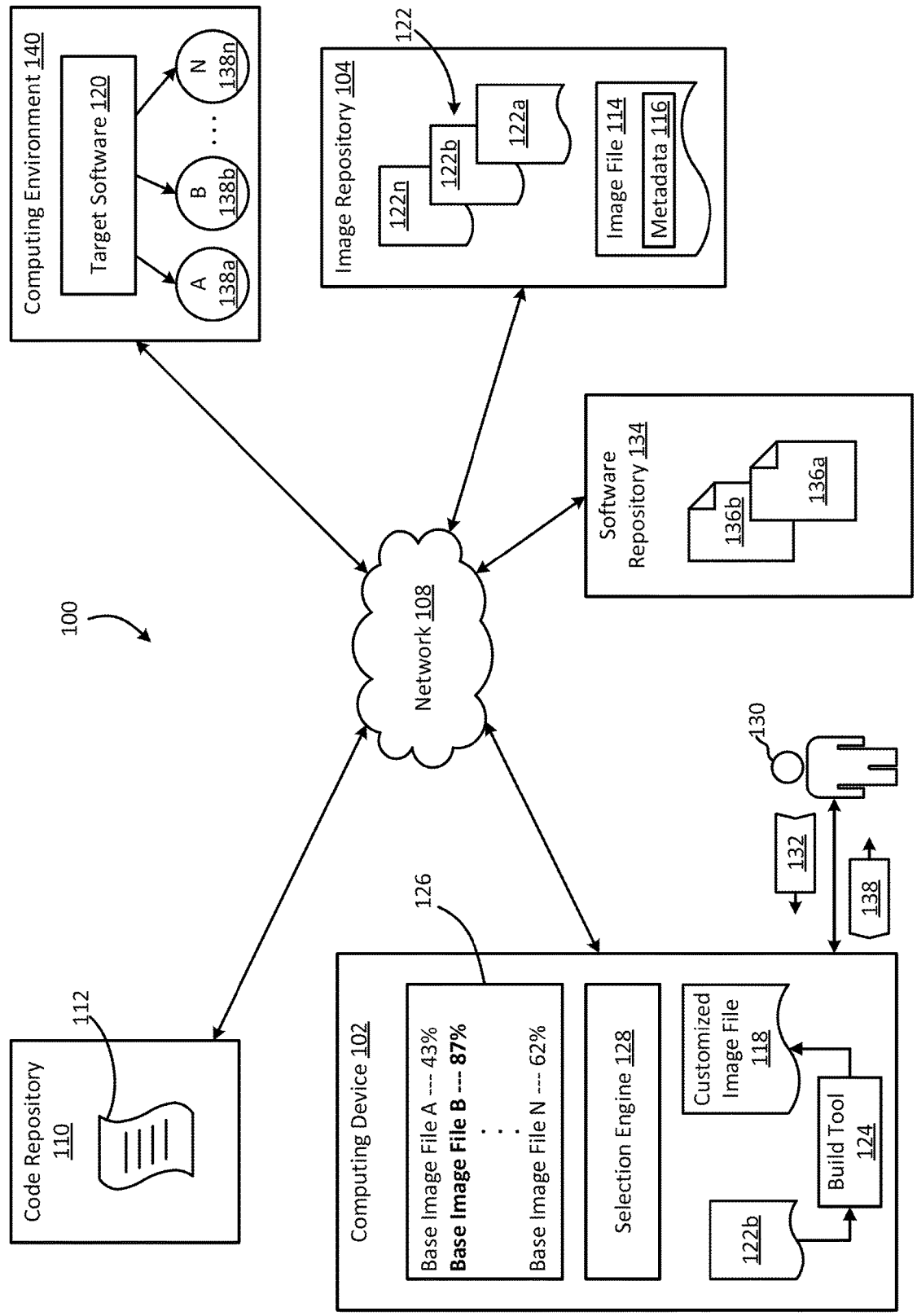
FIG. 1 is a block diagram of an example of a system for reducing the size of image files usable for deploying software according to some aspects of the present disclosure.

Software can be deployed in a computing environment using image files. The image files generally include the target software to be deployed along with its dependencies. But such image files can also include extraneous software items (e.g., packages, libraries, binaries, etc.) that are not required to run the target software. This can occur because the image files are often generated from base image files that are generic and over-inclusive. For example, a developer of target software may obtain a base image file from a publisher thereof. The developer may then combine additional software items with the base image file to build a customized image file (e.g., a specialized image file) for the target software. A customized image file can be an image file that has been adapted from a base image file for deploying target software and its dependencies to a computing environment. Because many developers may wish to use the same base image file as the foundation from which to build customized image files for various types of software, the base image file may be designed to be generic. For example, the base image file may contain the relevant dependencies for the target software as well as other extraneous software items, such as dependencies for other software. As a result, the customized image files derived from the base image file may be larger (in terms of storage size) than is necessary to run their target software. When applied to multiple image files, the cumulative effect can be that a significant amount of storage space is unnecessarily consumed due to this over-inclusivity.

Another problem arising from the abovementioned over-inclusivity is that the extraneous software items may be intentionally or accidentally run when the customized image file is deployed. Execution of these extraneous software items can unnecessarily consume computing resources, such as memory, processing power, storage space, and bandwidth. The extraneous software items may also introduce attack vectors that can be exploited by malicious actors, for example if the extraneous software items have vulnerabilities or bugs.

Some examples of the present disclosure can overcome one or more of the abovementioned problems by automatically selecting, from among a group of candidate base image files, the smallest base image file that satisfies one or more predefined criteria for use in constructing a customized image file for target software. One example of the predefined criteria may be that the base image file contains at least a predefined amount of the dependencies of the target software. Such a base image file may be considered the "optimal" base image file for the target software. By selecting the base image file based on these factors, the number of extraneous software items can be reduced and, consequently, the size of the resulting customized image file can be reduced.

For example, a system described herein can determine dependencies relied upon by target software by analyzing the source code for the target software. The system can then analyze each base image file in a group of candidate base image files to determine how many of the dependences are present in each base image file. The system can select whichever of the candidates contains at least a predefined amount of the dependencies. The predefined amount may be user customizable. If multiple base image files contain at least the predefined amount of dependencies, then the smallest base image file (e.g., in terms of storage size) can be selected from among the multiple base image files. The selected base image file can be considered the optimal base image file for the target software. The system can use the selected base image file as a foundation from which to build a customized image file configured for deploying the target software to a computing environment.

As one specific example, the system may determine that the target software is a microservice that requires 13 total dependencies to properly execute. The system can then automatically evaluate each base image file in a group of 135 candidate base image files to determine which of them contains at least a predefined amount of the required dependencies. The predefined amount may be 100% of the required dependencies or less than 100% of the required dependencies. In an example in which the predefined amount is 80%, the system may select one or more base image files that each contain at least 11 of the dependencies (since it is not possible to have a fraction of a dependency). If multiple base image files are selected that contain at least 11 of the dependencies, then the system can select whichever of those base image file is the smallest in size. The system can then build a customized image file based on the selected base image file, where the customized image file is configured for deploying the microservice to a computing environment. The customized image file may be generated based on the base image file and include any missing dependencies, so that the customized image file includes all required dependencies. Using these techniques, a base image file can be selected that strikes a desired balance between size and dependency coverage in relation to the target software, subject to the user's preferences. This, in turn, can reduce the number of attack vectors and resource consumption associated with the customized image file.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for optimizing images for deploying software according to some aspects of the present disclosure. The system 100 includes a computing device 102, such as a desktop computer, laptop computer, server, mobile phone, or tablet. The computing device 102 can include a selection engine 128 that is executable to automatically identify a base image file (e.g., an optimal base image file) for use in constructing a customized image file 118 for target software 120.

To identify the base image file, the selection engine 128 can begin by determining dependencies 138a-n of the target software 120. The target software 120 may be any type of software, such as a service, microservice, serverless function, or application. The target software 120 can rely on any number and combination of dependencies 138a-n. The selection engine 128 may determine the dependencies 138a-n of the target software 120 in any of the following ways, though other ways are also possible and contemplated within the scope of this disclosure.

One way in which the selection engine 128 can determine the dependencies 138a-n involves obtaining the source code 112 for the target software 120. For example, the selection engine 128 can retrieve the source code 112 from a code repository 110 or another location. The code repository 110 may include the source code of one or more pieces of software. After retrieving the source code 112, the selection engine 128 can parse through the source code 112 to locate references to (e.g., "include" statements for) libraries and other dependencies therein. The selection engine 128 can then recursively parse through those libraries and other dependencies to obtain a complete listing of the dependencies associated with the target software 120.

In some examples, the selection engine 128 may determine the location from which the source code 112 can be retrieved by analyzing the content or metadata 116 of an existing image file 114 for deploying the target software 120. The existing image file 114 may have previously been built and stored in an image repository 104 that is accessible to one or more users. The existing image file 114 may contain some or all of the dependencies 138a-n of the target software 120 along with extraneous software items. The metadata 116 may be included in the existing image file 114 or may be stored separately from the existing image file 114. The content or metadata 116 may include, for example, a network address from which the source code 112 can be retrieved. Examples of the network address can include an internet protocol (IP) address or a uniform resource locator (URL) address. In some such examples, the selection engine 128 can access the content or metadata 116, extract the network address therefrom, and obtain the source code 112 from the network address.

Another way in which the selection engine 128 can determine the dependencies 138a-n involves analyzing complementary information associated with the existing image file 114. Examples of the complementary information can include a "read me" file, a configuration file, a website, or the metadata 116 associated with the target software 120. In some examples, the complementary information may include a list of the dependencies of the target software 120 or otherwise indicate the dependencies. The selection engine 128 can therefore analyze the complementary information to determine the dependencies 138a-n.

Having determined the dependencies 138a-n of the target software 120, the selection engine 128 can determine a group of base image files 122 to analyze. For example, the selection engine 128 can access an image repository 104 in which hundreds or thousands of base image files are stored to identify a group of base image files 122 that are relevant to the target software 120. This may involve filtering through the base image files in the image repository 104 based on one or more filter criteria to identify the group of base image files 122. Examples of the filter criteria can include the size (e.g., disk size), name, or content of the base image files. For example, the selection engine 128 may filter the base image files by operating system and only select base image files having an operating system with which the target software 120 is compatible. This filtering process can reduce the total number of base image files in the group 122 and thus reduce the total number of base image files that are subsequently analyzed.

The selection engine 128 can next determine how many of the dependencies 138a-n are present in each base image file in the group of base image files 122. These amounts are represented in box 126 of FIG. 1. For example, the selection engine 128 may determine that base image file 122a contains 43% of the dependencies 138a-n, base image file 122b contains 87% of the dependencies 138a-n, and base image file 122n contains 62% of the dependencies 138a-n. The selection engine 128 may determine how many of the dependencies 138a-n are present in each base image file by analyzing the content of the base image file or complementary information associated with the base image file. Analyzing the content of a base image file may involve downloading the base image files (e.g., via a network 108 such as the Internet), opening it, and inspecting its contents.

Once the selection engine 128 has determined how many of the dependencies 138*a-n* are present in each of the base image files 122*a-n* in the group 122, the selection engine 128 can select a base image file from the group 122. In particular, the selection engine 128 can identify and select whichever base image file in the group 122 has at least a predefined amount of the dependencies 138*a-n*. The predefined amount may be user customizable. For example, a user 130 may provide user input 132 specifying the predefined amount. The predefined amount may be 100% or less than 100%.

As one particular example, the predefined amount can be 80%. So, the selection engine 128 may select base image file 122*b*, as represented in FIG. 1 by bolded text, because it is the only base image file that contains 80% or more of the dependencies 138*a-n*. As another example, the predefined amount may be 60%. Since base image file 122*b* and base image file 122*n* both contain at least 60% of the dependencies 138*a-n*, the selection engine 128 may select whichever of those two base image files is smaller in size. In this way, the selection engine 128 may filter the base image files 122*a-n* first by their dependency coverage and then by size. As yet another example, the predefined amount may be 100%. So, the selection engine 128 may not select any of the base image files in the group 122, because none of them contain all of the dependencies 138*a-n*.

If a base image file 122*b* is selected from the group 122, the selection engine 128 can next build a customized image file 118 based on the selected base image file 122*b*. To build the customized image file 118, the selection engine 128 can interact with a build tool 124. The build tool 124 can be software configured for building image files. The selection engine 128 can provide the base image file 122*b*, along with any other necessary or desired inputs, to the build tool 124 for causing the build tool 124 to construct the customized image file 118. In some cases the base image file 122*b* may exclude the target software 120, so the target software 120 may need to be supplied to the build tool 124 as a separate input. Once built, the customized image file 118 can be usable to deploy the target software 120 to a computing environment 140. In some examples, the computing environment 140 may be a distributed computing environment, such as a cloud computing system, a data grid, or a computing cluster. Alternatively, the computing environment 140 may be another type of computing environment.

In some examples, the selected base image file 122*b* may lack one or more of the dependencies 138*a-n* associated with the target software 120. So, the selection engine 128 can resolve this gap. For example, the selection engine 128 can identify missing dependencies. Missing dependencies are dependencies of the target software 120 that are absent from the base image file 122*b*. The selection engine 128 may identify the missing dependencies by comparing the required dependencies 138*a-n* to a list of dependencies present in the base image file 122*b*. After identifying the missing dependencies, the selection engine 128 can obtain the missing dependencies and provide them to the build tool 124 for inclusion in the customized image file 118. Obtaining the missing dependencies can involve downloading program code (e.g., binaries or source code) for the missing dependencies from one or more locations, such as a software repository 134.

Figure 2:
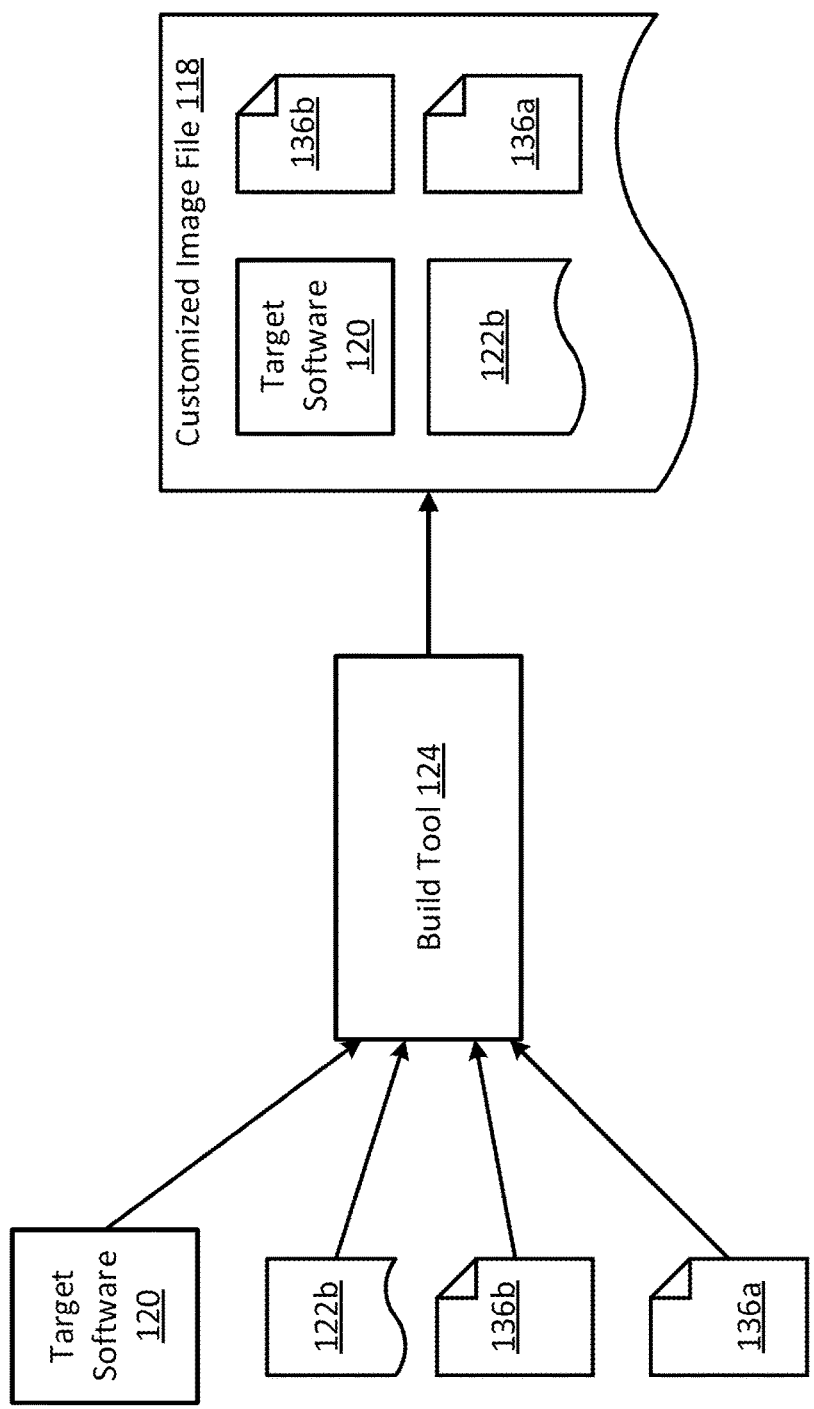
FIG. 2 is a block diagram of an example of process for building a customized image file from a base image file that is missing dependencies according to some aspects of the present disclosure.

One example of the above process is shown in FIG. 2. In this example, the selection engine 128 can determine that the base image file 122*b* is missing dependencies 138*a-b*. So, the selection engine 128 can obtain the missing dependencies 138*a-b*. This may involve downloading the program code 136*a-b* for the missing dependencies 138*a-b* from the software repository 134. The selection engine 129 can then provide the base image file 122*b*, the target software 120, and the missing dependencies 138*a-b* (e.g., the program code 136*a-b*) as input to the build tool 124, which can generate a customized image file 118 based on those inputs. Since the base image file 122*b* may be immutable in some situations, it may not be possible to directly edit the base image file 122*b* to add in the target software 120 and dependencies 138*a-b*. So, the build tool 124 can create the customized image file 118 as a new image file that is distinct from the base image file 122*b* and includes the target software 120, the dependencies 138*a-b*, and the base image file's content. In this way, the customized image file 118 may be built without modifying the base image file 122*b*.

In some examples, the selected base image file 122*b* may include one or more extraneous software items that are not required by the target software 120. So, the selection engine 128 can resolve this over-inclusiveness. For example, the selection engine 128 can identify extraneous software items in the base image file 122*b*. The selection engine 128 may identify the extraneous software items by comparing the dependencies 138*a-n* of the target software 120 to a list of software items present in the base image file 122*b*. The selection engine 128 can then notify the build tool 124 of the extraneous software items so that they can be excluded from the customized image file 118 during the build process. This can reduce the overall size of the customized image file 118, avoid the unnecessary consumption of computing resources by the extraneous software items, and eliminate attack vectors associated with the extraneous software items.

Figure 3:
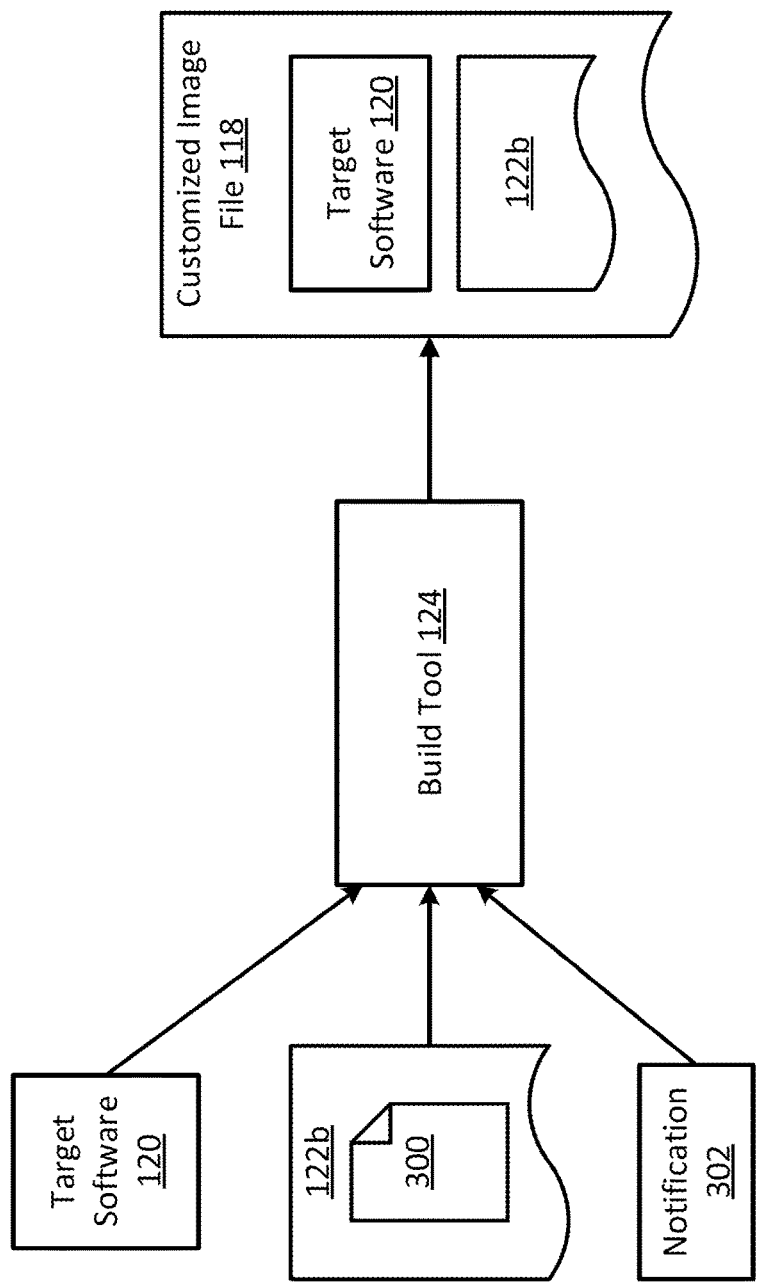
FIG. 3 is a block diagram of an example of a process for building a customized image file from a base image file that has an extraneous software item according to some aspects of the present disclosure

One example of the above process is shown in FIG. 3. As shown, the base image file 122*b* can include an extraneous software item 300. The build tool 124 can be notified of this extraneous software item 300 and, in response to this notification 302, generate a customized image file 118 that excludes the extraneous software item 300. Since the base image file 122*b* may be immutable in some situations, it may not be possible to directly edit the base image file 122*b* to remove the extraneous software item 300. So, the build tool 124 can create the customized image file 118 as a new image file that is distinct from the base image file 122*b* and excludes the extraneous software item 300. In this way, the customized image file 118 may be built without modifying the base image file 122*b*.

Although the above examples involve the selection engine 128 working with the build tool 124 to automatically build the customized image file 118, in other examples the selection engine 128 may instead output a recommendation 138 to the user 130 of how to construct the customized image file 118. This is further shown in FIG. 1. The recommendation 138 can notify the user 130 of the selected base image file 122*b*, any missing dependencies, and any extraneous software items. In some examples, the recommendation 138 can also include an option to download the base image file 122*b*. Additionally or alternatively, the recommendation 138 can include options to download the missing dependencies. The options may take the form of hyperlinks, in some examples. Providing the recommendation 138 to the user 130 may allow the user 130 to manually construct the customized image file 118.

Once the customized image file 118 has been built for the target software 120, the customized image file 118 can be used to deploy the target software 120 in a computing environment 140. For example, the customized image file 118 can be transmitted to the computing environment 140, which can contain a deployment tool that is executable for deploying the target software 120 based on the customized image file 118. In some examples, the deployment tool can deploy the target software 120 inside a relatively isolated virtual environment, such as a container or a virtual machine, within the greater computing environment 140.

Figure 4:
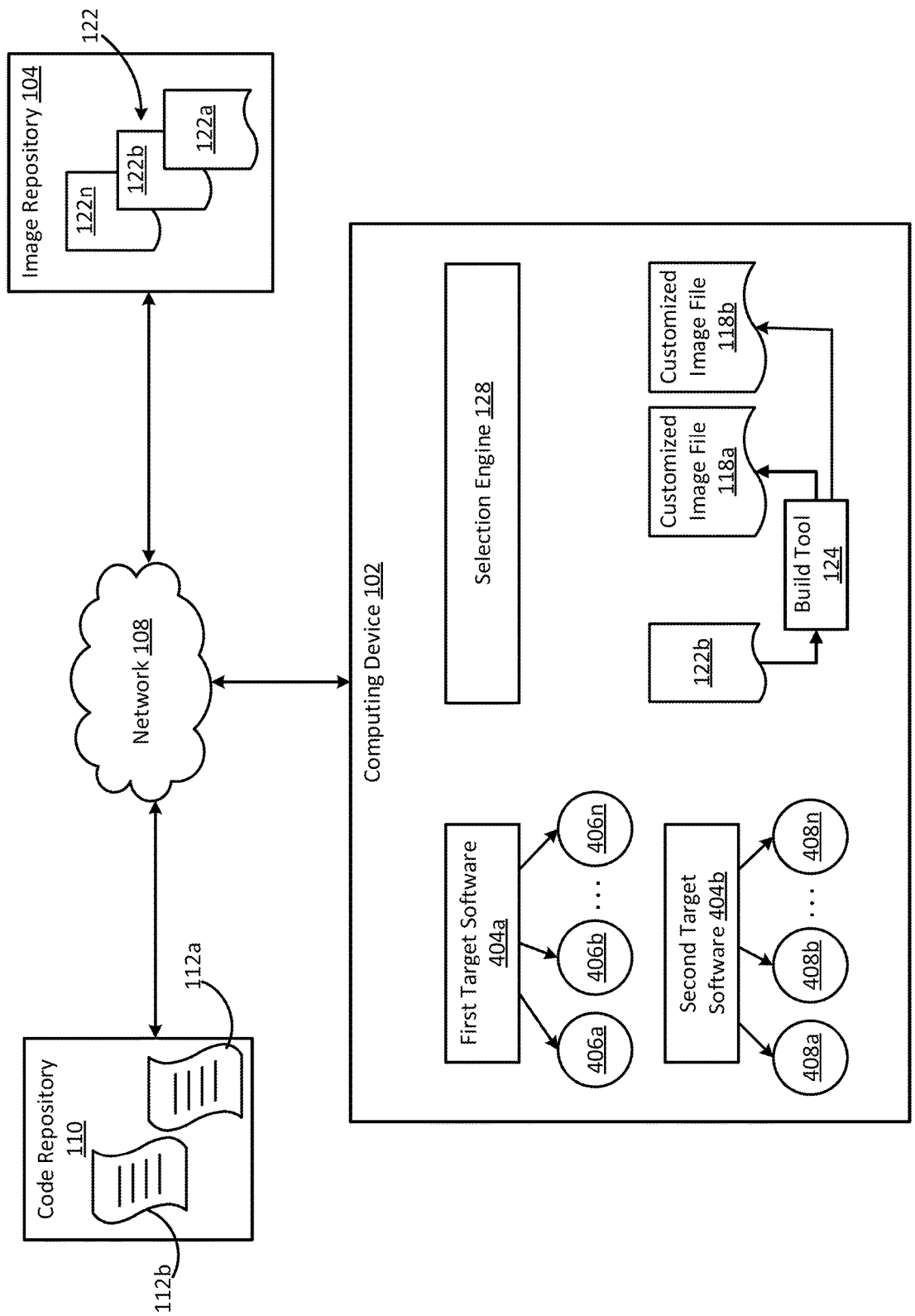
FIG. 4 is a block diagram of an example of a system for building a customized image file based on dependencies associated with multiple pieces of software according to some aspects of the present disclosure.

FIG. 4 shows a block diagram of an example in which the selection engine 128 may select a base image file based on dependencies associated with multiple pieces of target software. This may be useful in situations in which the base image file will be used to generate one or more customized image files for deploying two or more pieces of target software.

As shown in FIG. 4, the selection engine 128 can determine first target software 404a and second target software 404b for which one or more customized image files 118a-b are to be built. The selection engine 128 can next determine a first set of dependencies 406a-n for the first target software 404a and a second set of dependencies 408a-n for the second target software 404b. The selection engine 128 can determine these dependencies using any of the techniques described above. The selection engine 128 can then select a base image file 122b from among a group of base image files 122 based on the first set of dependencies 406a-n and the second set of dependencies 408a-n.

In some examples, the selection engine 128 can select a base image file 122b that contains at least a predefined amount of the total number of dependencies present across both the first set of dependencies 406a-n and the second set of dependencies 408a-n. The predefined amount can be user customizable. For instance, the first set of dependencies 406a-n may contain 15 dependencies, the second set of dependencies 408a-n may contain 13 dependencies, and the predefined amount may be 90%. So, the selection engine 128 can select a base image file that contains at least 90% of the 28 total dependencies present across the first set of dependencies 406a-n and the second set of dependencies 408a-n.

In other examples, the selection engine 128 can select a base image file that contains at least a predefined amount of overlapping dependencies between the first set of dependencies 406a-n and the second set of dependencies 408a-n. For instance, there can be 10 dependencies that are present in both the first set of dependencies 406a-n and the second set of dependencies 408a-n. So, the selection engine 128 can select a base image file 122b that has at least 90% of the 10 overlapping dependencies. If multiple base image files in the group 122 contain at least the predefined amount of dependencies, the base image file 122b with the smallest size can be selected from the group 122. This may reduce the amount of extraneous software items present in the selected base image file.

Using these techniques, a single base image file 122b can be selected for use in generating one or more customized image files 118a-b usable to deploy multiple pieces of target software 404a-b. The selected base image file 122b can be have a desired balance of dependency coverage and size, as compared to the other base image files in the group 122.

It will be appreciated that the specific number and arrangement of components shown in FIGS. 1-4 are intended to be illustrative and non-limiting. Other examples may involve more components, different components, or a different arrangement of the components than is shown in FIGS. 1-4. For example, the selection engine 128 may be located on a different computing device than the build tool 124. In one such example, the selection engine 128 may be located on a server (e.g., a cloud server) that is accessible to a client device of a user 130 via a network 108. The user 130 may operate the client device to interact with the selection engine 128 in order to determine which base image file to use in building a customized image file 118. The user 130 may then build the customized image file 118 using a build tool 124 that is located on their client device or in another location that is different from the server.

Figure 5:
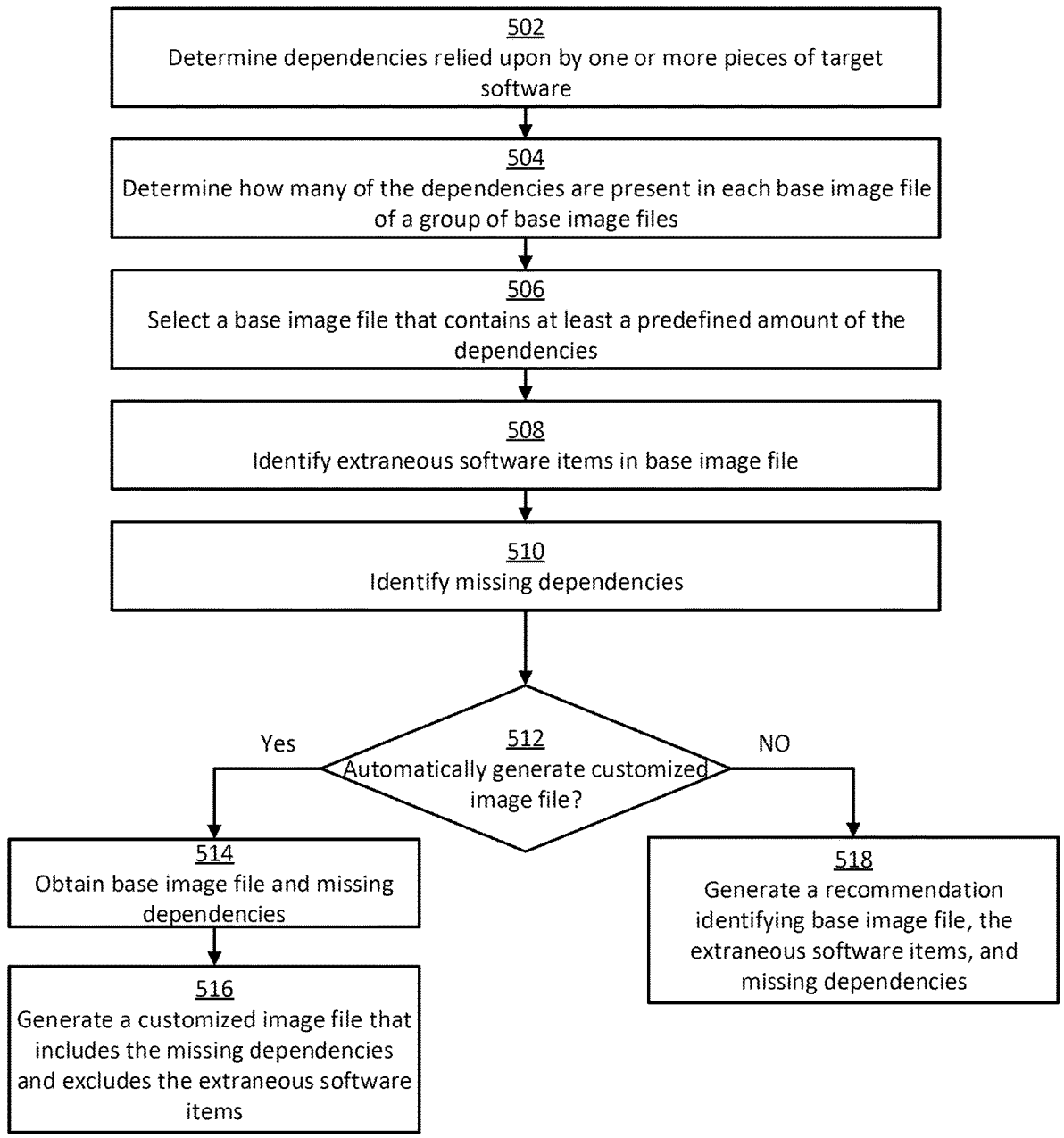
FIG. 5 is a flow chart of an example of a process for generating a customized image file or a recommendation according to some aspects of the present disclosure.

FIG. 5 is a flow chart of an example of a process for generating a customized image file or a recommendation according to some aspects of the present disclosure. Other examples may involve more operations, fewer operations, different operations, or a different order of the operations shown in FIG. 5. The operations of FIG. 5 are described below with reference to the components of FIG. 1 described above.

In block 502, a computing device 102 (e.g., executing selection engine 128) determines dependencies 138a-n relied upon one or more pieces of target software, such as target software 120. This may involve analyzing source code, such as source code 112, of the one or more pieces of target software or complementary information associated with the one or more pieces of target software.

In block 504, the computing device 102 determines how many of the dependencies are present in each base image file 122a-n of a group of base image files 122. For example, the computing device 102 can analyze the contents of a base image file, or metadata associated with the base image file, to determine the base image file's contents. The computing device 102 can then compare the base image file's contents to a list of the dependencies to identify the number of overlaps between the two. The computing device 102 can iterate this process for each base image file in the group 122.

In block 506, the computing device 102 selects a base image file 122b that contains at least a predefined amount of the dependencies. The predefined amount may be considered a criterion that is chosen by the user based on their objectives. The base image file 122b may be further selected based on its size, for example if multiple base image files contain at least the predefined amount of the dependencies, so that that the smallest base image file satisfying the user's criterion is selected.

In block 508, the computing device 102 identifies one or more extraneous software items in the base image file 122b. For example, the computing device 102 can compare the base image file's contents to a list of the dependencies to identify the differences between the two. If the differences correspond to software items that are both present in the base image file 122b and absent from the list, then those software items may be considered extraneous software items.

In block 510, the computing device 102 identifies one or more missing dependencies. For example, the computing device 102 can compare the base image file's contents to a list of the dependencies to identify the differences between the two. If the differences correspond to software items that are both present on the list and absent from the base image file 122b, then those software items may be considered missing dependencies.

In block 512, the computing device 102 determines whether a customized image file 118 for the target software 120 is to be automatically generated. This may be a user selectable option. The user may set the option to one value if the customized image file 118 is to be automatically generated and to another value if the customized image file 118 is not to be automatically generated. The computing device 102 can determine whether the customized image file 118 is to be automatically generated based on the option's value.

If the computing device 102 determines that the customized image file 118 is to be automatically generated at block 512, the process can proceed to block 514. In block 514, the computing device 102 can obtain the base image file 122b and any missing dependencies. For example, the computing device 102 can download some or all of these files from one or more repositories via network 108. In block 516, the computing device 102 can generate the customized image file 118 using a build tool 124. The customized image file 118 can be customized to include some or all of the missing dependences and exclude some or all of the extraneous software items.

If the computing device 102 determines that the customized image file 118 is not to be automatically generated at block 512, the process can proceed to block 518. In block 518, the computing device 102 can generate a recommendation 138 for a user 130 relating to how to build the customized image file 118. The recommendation 138 can specify the base image file 122b, some or all of the extraneous software items, and some or all of the missing dependencies. The user 130 may then be able to manually construct the customized image file 118 based on the recommendation 138.

Figure 6:
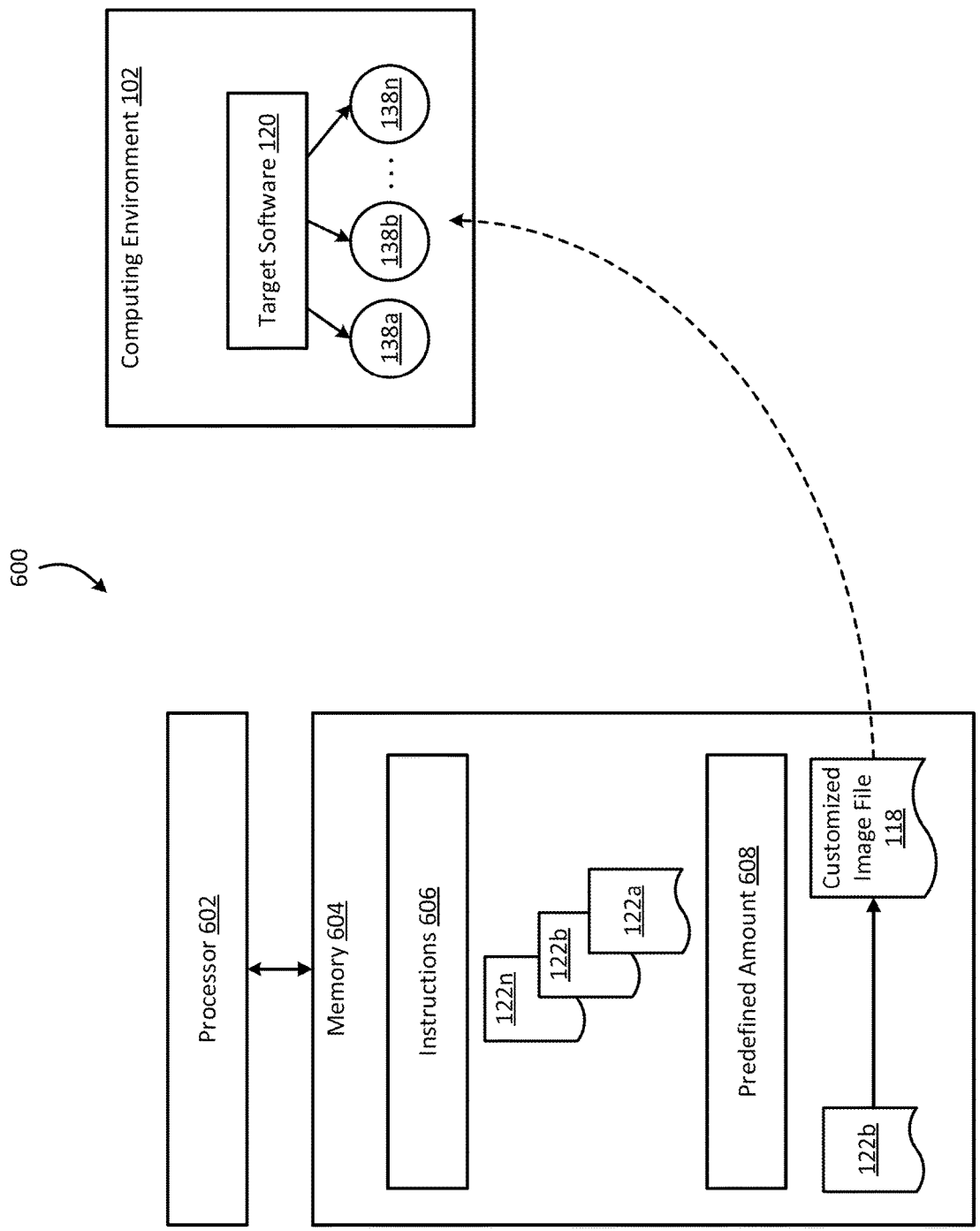
FIG. 6 is a block diagram of an example of a system for building a customized image file according to some aspects of the present disclosure.

FIG. 6 is a block diagram of another example of a system 600 for building a customized image file 118 according to some aspects of the present disclosure. The system 600 includes a processor 602 communicatively coupled to a memory 604. In some examples, the processor 602 and the memory 604 may be parts of the same computing device, such as the computing device 102 of FIG. 1. In other examples, the processor 602 and the memory 604 may be distributed from (e.g., remote to) one another.

The processor 602 is hardware that can include one processing device or multiple processing devices. Non-limiting examples of the processor 602 include a Field-Programmable Gate Array (FPGA), an application-specific integrated circuit (ASIC), or a microprocessor. The processor 602 can execute instructions 606 stored in the memory 604 to perform computing operations. In some examples, the instructions 606 may correspond to the selection engine 128, the build tool 124, or both. The instructions 606 may include processor-specific instructions generated by a compiler or an interpreter from code written in any suitable computer-programming language, such as C, C++, C#, Python, or Java.

The memory 604 is hardware that can include one memory device or multiple memory devices. The memory 604 can be volatile or can be non-volatile, such that it can retain stored information when powered off. Some examples of the memory 604 can include electrically erasable and programmable read-only memory (EEPROM), flash memory, or any other type of non-volatile memory. At least some of the memory 604 includes a non-transitory computer-readable medium from which the processor 602 can read instructions. A computer-readable medium can include electronic, optical, magnetic, or other storage devices capable of providing the processor 602 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 606.

In some examples, the processor 602 can execute the instructions 606 to perform some or all of the functionality described herein. For example, the processor 602 can identify base image files 122a-n that each include at least a predefined amount 608 of dependencies 138a-n relied upon by target software 120. The processor 602 can then select a base image file 122b, from the base image files 122a-n, having a smallest size as compared to a remainder of the base image files. After selecting the base image file 122b, the processor 602 can build a customized image file 118. The customized image file 118 can be configured for deploying the target software 120 to a computing environment 140, as represented by the dashed arrow.

Figure 7:
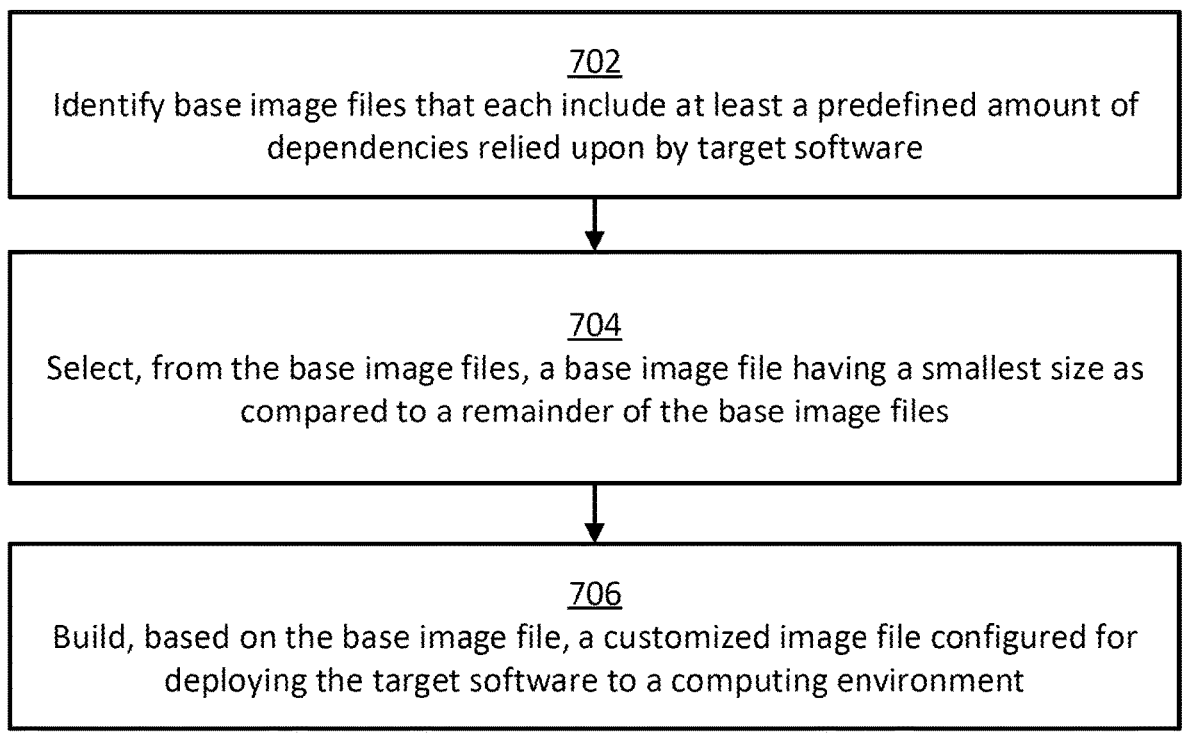
FIG. 7 is a flow chart of another example of a process building a customized image file according to some aspects of the present disclosure.

In some examples, the processor 602 can implement the process shown in FIG. 7. Other examples may involve more operations, fewer operations, different operations, or a different order of the operations shown in FIG. 7. The operations of FIG. 7 are described below with reference to the components of FIGS. 1 and 6 described above.

In block 702, the processor 602 identifies base image files 122b-n that each include at least a predefined amount 608 of dependencies 138a-n relied upon by target software 120. For example, the processor 602 can determine the dependencies 138a-n of the target software 120. The processor 602 can then determine how many of the dependencies 138a-n are present in each base image file 122a-n among a group of base image files 122. For example, the processor 602 can determine that base image file 122a includes 7 of the dependencies 138a-n, that base image file 122b includes 11 of the dependencies 138a-n, and that base image file 122n includes 9 of the dependencies 138a-n. The processor 602 can store those numeric values in memory in relation to their corresponding base image files 122a-n. The processor 602 can compare the stored values to the predefined amount 608 to determine that a subset of the group 122, for example base image file 122b and base image file 122n (but not base image file 122a), include at least the predefined amount 608 of the dependencies 138a-n.

In block 704, the processor 602 selects a base image file 122b, from the base image files 122b-n, having a smallest size as compared to a remainder of the base image files. For example, the processor 602 can determine a first size of base image file 122b and a second size of base image file 122n. One example of the first size and the second size may be 1.1 GB and 1.25 GB, respectively. The processor 602 can compare the first size to the second size to determine which of the two is smallest. Based on this comparison, the processor 602 can determine that the base image file 122b has the smallest size and consequently select the base image file 122b for further use.

In block 706, the processor 602 builds a customized image file 118 based on the selected base image file 122b. For example, the processor 602 can provide the base image file 122b as input to a build tool 124 for use in constructing the customized image file 118. The customized image file 118 can be configured for deploying the target software 120 to a computing environment 140.

Figure 8:
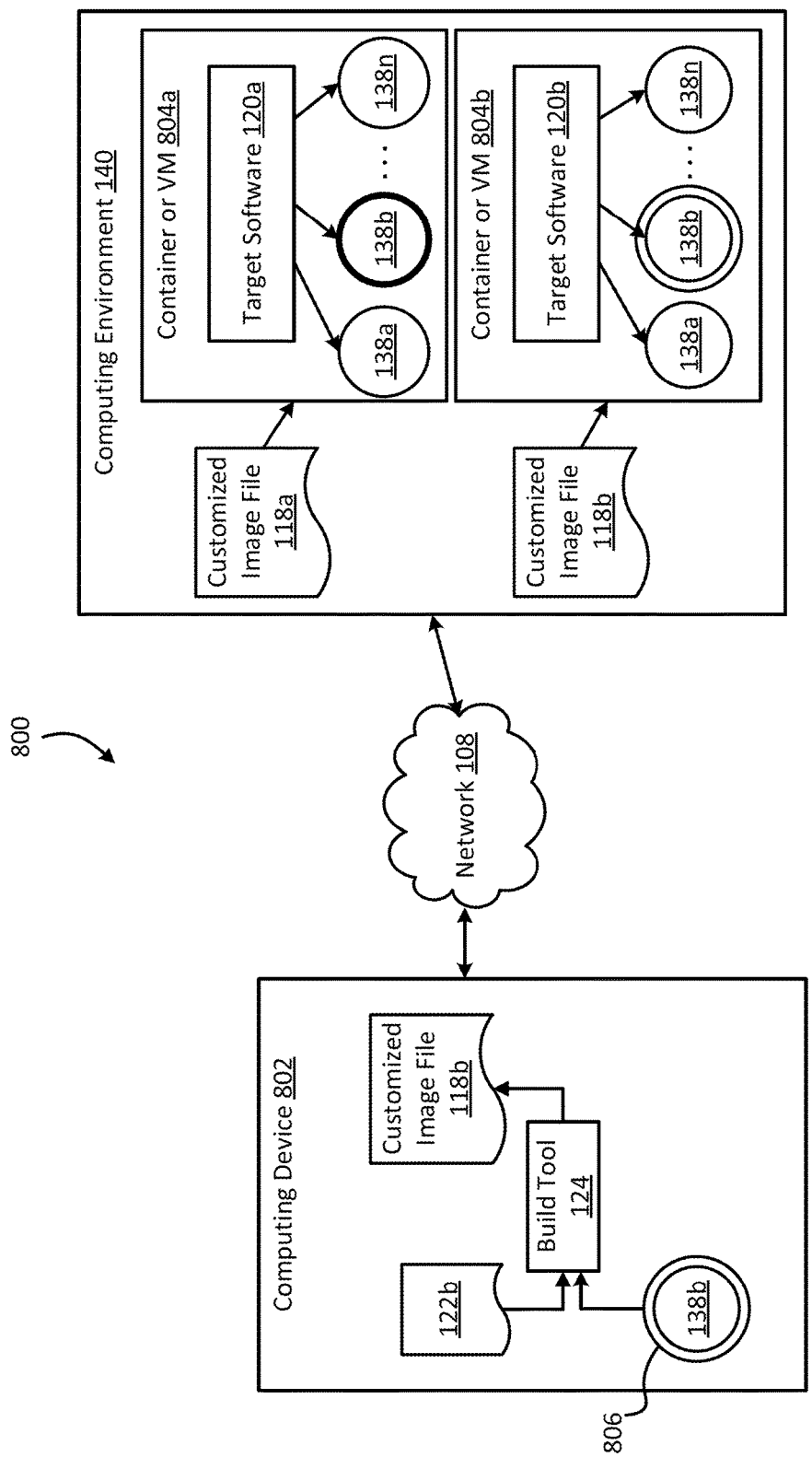
FIG. 8 is a block diagram of an example of a system for updating a customized image file according to some aspects of the present disclosure.

FIG. 8 is a block diagram of an example of a system 800 for updating a customized image file according to some aspects of the present disclosure. The system 800 includes an instance of target software 120a deployed in a computing environment 140 from a customized image file 118a.

After deploying the target software 120a, the system 800 (e.g., computing device 802) can monitor one or more security databases to detect a vulnerability associated with the target software 120a, such as a vulnerability in the target software 120a itself or one of its dependencies. One example of such a database can include a common vulnerabilities and exposures database. The system 800 may perform this monitoring automatically by interacting with various application programming interfaces (APIs) associated with the security databases.

Upon determining that such a vulnerability exists, the system 800 can obtain a new version of the vulnerable software and use it to generate a new version of the customized image file 118b that lacks the vulnerability. The system 800 can automatically generate the new version of the customized image file 118b using any of the techniques described above. Using the new version of the customized image file 118b, the system 800 may then deploy a new instance of the target software 120b that lacks the vulnerability in the computing environment 140. Additionally or alternatively, the system 800 can upload the new version of the customized image file 118b to a repository for use by other users. In this way, the system 800 can automatically detect and resolve security vulnerabilities.

In one specific example shown in FIG. 8, the system 800 (e.g., the computing device 802) has determined that a vulnerability exists in dependency 138b, as indicated by its thick border in FIG. 1. So, the system 800 can obtain a new version 806 of dependency 138b and provide it to a build tool 124, along with a base image file 122b selected using any of the techniques described above, to generate the new version of the customized image file 118b that excludes the vulnerability. The customized image file 118b may then be used to deploy a new instance of the target software 120b that lacks the vulnerability in the computing environment 140.

In some examples, either or both of the instances of the target software 120a-b may be deployed inside containers or virtual machines 804a-b. For example, the first instance of the target software 120a can be deployed inside container or virtual machine 804a, and the second instance of the target software 120b can be deployed inside container or virtual machine 804b. The customized image files 118a-b can be configured to facilitate such deployments.

Although FIG. 8 shows a certain number and arrangement of components, this is intended to be illustrative and non-limiting. Other examples may include more components, fewer components, different components, or a different arrangement of the components than is shown in FIG. 8. For instance, in other examples the instances of the target software 120a-b may be deployed in separate computing environments, rather than the same computing environment 140. Additionally, the computing device 802 may be part of the computing environment 140, rather than external to it, in other examples.

In some aspects, the size of image files usable for deploying software in computing environments can be reduced according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: identify base image files that each include at least a predefined amount of dependencies relied upon by target software; select a base image file, from the base image files, having a smallest size as compared to a remainder of the base image files; and build, based on the base image file, a customized image file configured for deploying the target software to a computing environment.

Example #2: The non-transitory computer-readable medium of Example #1, further comprising program code that is executable by the processor for causing the processor to: receive an existing image file configured for deploying the target software to the computing environment, the existing image file being different from the customized image file and the base image file; extract a network address from metadata of the existing image file; obtain source code for the target software from the network address; and determine the dependencies of the target software by analyzing the source code.

Example #3: The non-transitory computer-readable medium of any of Examples #1-2, further comprising program code that is executable by the processor for causing the processor to: determine how many of the dependencies are present in each base image file of a group of base image files; and select the base image files from the group of base image files in response to determining that the base image files each include at least the predefined amount of the dependencies relied upon by the target software.

Example #4: The non-transitory computer-readable medium of any of Examples #1-3, wherein the predefined amount is less than 100% of the dependencies.

Example #5: The non-transitory computer-readable medium of any of Examples #1-3, wherein the predefined amount is 100% of the dependencies.

Example #6: The non-transitory computer-readable medium of any of Examples #1-5, further comprising program code that is executable by the processor for causing the processor to: based on selecting the base image file, obtain the base image file from a repository that includes the base image files; and build the customized image file to include the base image file and one or more missing dependencies that are absent from the base image file.

Example #7: The non-transitory computer-readable medium of any of Examples #1-6, wherein the dependencies relied upon by the target software are a first plurality of dependencies, and further comprising program code that is executable by the processor for causing the processor to: determine a second plurality of dependencies relied upon by other target software; determine overlapping dependencies between the first plurality of dependencies and the second plurality of dependencies; and select the base image file from the base image files in response to determining that the base image file includes at least the predefined amount of the overlapping dependencies.

Example #8: The non-transitory computer-readable medium of any of Examples #1-7, wherein the base image file excludes the target software and the customized image file includes the target software.

Example #9: The non-transitory computer-readable medium of any of Examples #1-8, further comprising program code that is executable by the processor for causing the processor to: determine one or more extraneous software items that are included in the base image file and extraneous to execution of the target software; and generate the customized image file to exclude the extraneous software items.

Example #10. The non-transitory computer-readable medium of any of Examples #1-9, further comprising program code that is executable by the processor for causing the processor to: deploy a first instance of the target software to the computing environment; and subsequent to deploying the first instance to the computing environment: determine that a dependency, among the dependencies relied upon by the target software, has a vulnerability; in response to determining that the dependency has the vulnerability, build an updated version of the customized image file in which a first version of the dependency that includes the vulnerability is replaced by a second version of the dependency that lacks the vulnerability; deploy a second instance of the target software using the updated version of the customized image file, the second instance lacking the vulnerability; and subsequent to deploying the second instance, shut down the first instance of the target software.

Example #11: A method comprising: identifying, by a processor, base image files that each include at least a predefined amount of dependencies relied upon by target software; selecting, by the processor and from the base image files, a base image file having a smallest size as compared to a remainder of the base image files; and building, by the processor and based on the base image file, a customized image file configured for deploying the target software to a computing environment.

Example #12: The method of Example #11, further comprising: receiving an existing image file configured for deploying the target software to the computing environment, the existing image file being different from the customized image file and the base image file; extracting metadata of the existing image file; obtaining source code for the target software using information in the metadata; and determining the dependencies based on the source code.

Example #13: The method of any of Examples #11-12, further comprising: determining how many of the dependencies are present in each base image file of a group of base image files; and selecting the base image files from the group of base image files in response to determining that the base image files each include at least the predefined amount of dependencies relied upon by the target software.

Example #14: The method of any of Examples #11-13, wherein the predefined amount is less than 100% of the dependencies.

Example #15: The method of any of Examples #11-14, further comprising: based on selecting the base image file, obtaining the base image file from a repository that includes the base image files; and building the customized image file to include the base image file and one or more missing dependencies that are absent from the base image file.

Example #16: The method of any of Examples #11-13 and 15, wherein the predefined amount is 100% of the dependencies.

Example #17: The method of any of Examples #11-16, wherein the dependencies relied upon by the target software are a first plurality of dependencies, and further comprising: determining a second plurality of dependencies relied upon by other target software; determining overlapping dependencies between the first plurality of dependencies and the second plurality of dependencies; and selecting the base image file from the base image files in response to determining that the base image file includes at least the predefined amount of the overlapping dependencies.

Example #18: The method of any of Examples #11-17, wherein the base image file includes the target software.

Example #19: The method of any of Examples #11-18, further comprising: determining one or more extraneous software items that are included in the base image file and extraneous to execution of the target software; and generating the customized image file to exclude the extraneous software items.

Example #20: A system comprising: a processor; and a memory including instructions that are executable by the processor for causing the processor to: identify base image files that each include at least a predefined amount of dependencies relied upon by target software; select a base image file, from the base image files, having a smallest size as compared to a remainder of the base image files; and build, based on the base image file, a customized image file configured for deploying the target software to a computing environment.

Example #21: A non-transitory computer-readable medium comprising program code that is executable by a processor for causing the processor to: determine dependencies relied upon by target software; and based on determining the dependencies: identify base image files that each include at least a predefined amount of the dependencies relied upon by target software; select a base image file, from the base image files, having a smallest size as compared to a remainder of the base image files; determining one or more dependencies of the target software that are absent from the base image file; and generate and output a recommendation for how to build a customized image file configured for deploying the target software to a computing environment, the recommendation identifying the base image file as a starting point and indicating that the one or more dependencies are absent from the base image file for enabling a user to build the customized image file.

Example #22: The non-transitory computer-readable medium of Example #21, wherein the recommendation further includes an option to download the base image file from a repository of base image files.

Example #23: The non-transitory computer-readable medium of any of Examples #21-22, wherein the recommendation further includes options to download the one or more dependencies from one or more locations.

Example #24: The non-transitory computer-readable medium of any of Examples #21-23, further comprising program code that is executable by the processor for causing the processor to: receive an existing image file configured for deploying the target software to the computing environment, the existing image file being different from the customized image file and the base image file; extract a network address from metadata of the existing image file; obtain source code for the target software from the network address; and determine the dependencies by analyzing the source code.

Example #25: The non-transitory computer-readable medium of any of Examples #21-24, wherein the predefined amount is less than 100% of the dependencies.

Example #26: The non-transitory computer-readable medium of any of Examples #21-25, wherein the predefined amount is 100% of the dependencies.

Example #27: The non-transitory computer-readable medium of any of Examples #21-26, further comprising program code that is executable by the processor for causing the processor to determine how many of the dependencies are present in each of the base image files.

Example #28: A method comprising: determining, by a processor, dependencies relied upon by target software; and based on determining the dependencies: identifying, by the processor, base image files that each include at least a predefined amount of the dependencies relied upon by target software; selecting, by the processor and from the base image files, a base image file having a smallest size as compared to a remainder of the base image files; determining, by the processor, one or more dependencies of the target software that are absent from the base image file; and generating, by the processor, a recommendation for how to build a customized image file configured for deploying the target software to a computing environment, the recommendation identifying the base image file as a starting point and indicating that the one or more dependencies are absent from the base image file for enabling a user to build the customized image file.

Example #29: The method of Example #28, wherein the recommendation further includes an option to download the base image file from a repository of base image files.

Example #30: The method of any of Examples #28-29, wherein the recommendation further includes options to download the one or more dependencies from one or more locations.

Example #31: The method of any of Examples #28-30, further comprising: receiving an existing image file configured for deploying the target software in the computing environment, the existing image file being different from the customized image file and the base image file; extracting metadata from the existing image file; and determining the dependencies by using information included in the metadata.

Example #32: The method of any of Examples #28-21, further comprising determining how many of the dependencies are present in each of the base image files.

Example #33: The method of any of Examples #28-32, wherein the dependencies relied upon by the target software are a first plurality of dependencies, and further comprising: determining a second plurality of dependencies relied upon by other target software; determining overlapping dependencies between the first plurality of dependencies and the second plurality of dependencies; and selecting the base image file from the base image files in response to determining that the base image file includes at least the predefined amount of the overlapping dependencies.

Example #34. The method of any of Examples #28-33, wherein the base image file excludes the target software and the customized image file includes the target software.

Example #35: A non-transitory computer-readable medium comprising program code that is executable by a processor for causing the processor to: determine dependencies relied upon by target software; and based on determining the dependencies: identify base image files that each include at least a predefined amount of the dependencies relied upon by target software; select a base image file, from the base image files, having a smallest size as compared to a remainder of the base image files; determine one or more extraneous software items that are included in the base image file and extraneous to execution of the target software; and generate and output a recommendation for how to build a customized image file configured for deploying the target software to a computing environment, the recommendation identifying the base image file and indicating that the one or more extraneous software items are removable from the base image file.

Example #36: A method comprising: determining, by a processor, dependencies relied upon by target software; and based on determining the dependencies: identifying, by the processor, base image files that each include at least a predefined amount of the dependencies relied upon by target software; selecting, by the processor and from the base image files, a base image file having a smallest size as compared to a remainder of the base image files; determining, by the processor, one or more extraneous software items that are included in the base image file and extraneous to execution of the target software; and outputting, by the processor, a recommendation for how to build a customized image file configured for deploying the target software to a computing environment, the recommendation identifying the base image file and indicating that the one or more extraneous software items are removable from the base image file.

Example #37: A system comprising: means for identifying base image files that each include at least a predefined amount of dependencies relied upon by target software; means for selecting a base image file, from the base image files, having a smallest size as compared to a remainder of the base image files; and means for building, based on the base image file, a customized image file configured for deploying the target software to a computing environment.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer-readable medium comprising program code that is executable by a processor for causing the processor to:
receive an indication of target software that is to be combined with a base image file to generate a customized image file, the customized image file being configured for deploying the target software in a computing environment;
determine a threshold amount of the target software's dependencies that must be included in the base image file, the threshold amount of dependencies being a customizable numerical value usable as a selection criterion for selecting the base image file from among a group of candidate base image files;
identify a subset of the group of candidate base image files that satisfy the selection criterion by, for each base image file in the group of candidate base image files:
determining a respective number of dependencies of the target software that are present in the base image file;
determining whether the respective number of dependencies in the base image file is greater than or equal to the threshold amount of dependencies; and
in response to determining that the respective number of dependencies in the base image file is greater than or equal to the threshold amount of dependencies, incorporating the base image file into the subset;
select the base image file, from the subset, in response to determining that the base image file has a smallest size as compared to a remainder of the base image files in the subset; and
based on selecting the base image file, build the customized image file for the target software using the base image file.

2. The non-transitory computer-readable medium of claim 1, further comprising program code that is executable by the processor for causing the processor to:
receive an existing image file configured for deploying the target software to the computing environment, the existing image file being different from the customized image file and the base image file;
extract a network address from metadata of the existing image file;
obtain source code for the target software from the network address; and
determine the dependencies of the target software by analyzing the source code.

3. The non-transitory computer-readable medium of claim 1, wherein the threshold amount of dependencies is less than 100% of the dependencies of the target software.

4. The non-transitory computer-readable medium of claim 1, wherein the threshold amount of dependencies is 100% of the dependencies of the target software.

5. The non-transitory computer-readable medium of claim 1, further comprising program code that is executable by the processor for causing the processor to:
- based on selecting the base image file, obtain the base image file from a repository that includes the group of candidate base image files; and
- build the customized image file to include the base image file and one or more missing dependencies that are absent from the base image file.

6. The non-transitory computer-readable medium of claim 1, wherein the dependencies relied upon by the target software are a first plurality of dependencies, and further comprising program code that is executable by the processor for causing the processor to:
- determine a second plurality of dependencies relied upon by other target software;
- determine overlapping dependencies between the first plurality of dependencies and the second plurality of dependencies; and
- select the base image file from the group of candidate base image files in response to determining that the base image file includes at least the threshold amount of the overlapping dependencies.

7. The non-transitory computer-readable medium of claim 1, wherein the base image file excludes the target software and the customized image file includes the target software.

8. The non-transitory computer-readable medium of claim 1, further comprising program code that is executable by the processor for causing the processor to:
- determine one or more extraneous software items that are included in the base image file and extraneous to execution of the target software; and
- generate the customized image file to exclude the extraneous software items.

9. The non-transitory computer-readable medium of claim 7, further comprising program code that is executable by the processor for causing the processor to:
- deploy a first instance of the target software to the computing environment; and
- subsequent to deploying the first instance to the computing environment:
  - determine that a dependency, among the dependencies relied upon by the target software, has a vulnerability;
  - in response to determining that the dependency has the vulnerability, build an updated version of the customized image file in which a first version of the dependency that includes the vulnerability is replaced by a second version of the dependency that lacks the vulnerability;
  - deploy a second instance of the target software using the updated version of the customized image file, the second instance lacking the vulnerability; and
  - subsequent to deploying the second instance, shut down the first instance of the target software.

10. The non-transitory computer-readable medium of claim 1, wherein the threshold amount of dependencies is user customizable.

11. A method comprising:
- receiving, by a processor, an indication of target software that is to be combined with a base image file to generate a customized image file, the customized image file being configured for deploying the target software in a computing environment;
- determining, by the processor, a threshold amount of the target software's dependencies that must be included in the base image file, the threshold amount of dependencies being a customizable numerical value usable as a selection criterion for selecting the base image file from among a group of candidate base image files;
- identifying, by the processor, a subset of the group of candidate base image files that satisfy the selection criterion by, for each base image file in the group of candidate base image files:
  - determining a respective number of dependencies of the target software that are present in the base image file;
  - determining whether the respective number of dependencies in the base image file is greater than or equal to the threshold amount of dependencies; and
  - in response to determining that the respective number of dependencies in the base image file is greater than or equal to the threshold amount of dependencies, incorporating the base image file into the subset;
- selecting, by the processor from the subset, the base image file in response to determining that the base image file has a smallest size as compared to a remainder of the base image files in the subset; and
- based on selecting the base image file, building, by the processor, the customized image file using the base image file.

12. The method of claim 11, further comprising:
- receiving an existing image file configured for deploying the target software to the computing environment, the existing image file being different from the customized image file and the base image file;
- extracting metadata of the existing image file;
- obtaining source code for the target software using information in the metadata; and
- determining the dependencies based on the source code.

13. The method of claim 11, wherein the threshold amount of dependencies is less than 100% of the dependencies of the target software.

14. The method of claim 13, further comprising:
- based on selecting the base image file, obtaining the base image file from a repository that includes the group of candidate base image files; and
- building the customized image file to include the base image file and one or more missing dependencies that are absent from the base image file.

15. The method of claim 11, wherein the threshold amount of dependencies is 100% of the dependencies of the target software.

16. The method of claim 11, wherein the dependencies relied upon by the target software are a first plurality of dependencies, and further comprising:
- determining a second plurality of dependencies relied upon by other target software;
- determining overlapping dependencies between the first plurality of dependencies and the second plurality of dependencies; and
- selecting the base image file from the group of candidate base image files in response to determining that the base image file includes at least the threshold amount of the overlapping dependencies.

17. The method of claim 11, wherein the base image file includes the target software.

18. The method of claim 11, further comprising:
- determining one or more extraneous software items that are included in the base image file and extraneous to execution of the target software; and generating the customized image file to exclude the extraneous software items.

19. The method of claim 11, further comprising receiving the threshold amount of dependencies as a user input from a user.

20. A system comprising:
a processor; and
a memory including instructions that are executable by the processor for causing the processor to:
receive an indication of target software that is to be combined with a base image file to generate a customized image file, the customized image file being configured for deploying the target software in a computing environment;
determine a threshold amount of the target software's dependencies that must be included in the base image file, the threshold amount of dependencies being a customizable numerical value usable as a selection criterion for selecting the base image file from among a group of candidate base image files;
identify a subset of the group of candidate base image files that satisfy the selection criterion by, for each base image file in the group of candidate base image files:
determining a respective number of dependencies of the target software that are present in the base image file;
determining whether the respective number of dependencies in the base image file is greater than or equal to the threshold amount of dependencies; and
in response to determining that the respective number of dependencies in the base image file is greater than or equal to the threshold amount of dependencies, incorporating the base image file into the subset;
select the base image file, from the subset, in response to determining that the base image file has a smallest size as compared to a remainder of the base image files in the subset; and
based on selecting the base image file, build the customized image file for the target software using the base image file.

* * * * *